Figure 1:
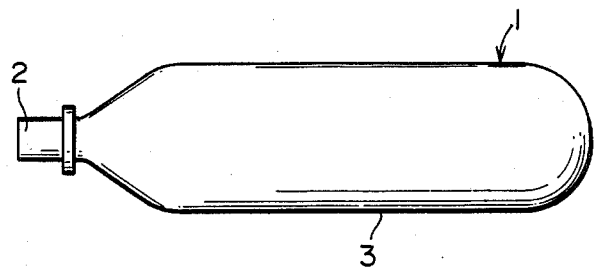

United States Patent [19]

Shimizu et al.

[11] Patent Number: 4,728,549
[45] Date of Patent: Mar. 1, 1988

[54] MULTILAYERED CONTAINER

[75] Inventors: Senzo Shimizu, Odawara; Mitsuyasu Nagano; Tsutomu Ishizeki, both of Hiratsuka; Yoshiaki Momose, Hadano, all of Japan

[73] Assignee: Mitsubishi Gas Chemical Company, Inc., Tokyo, Japan

[21] Appl. No.: 793,095

[22] Filed: Oct. 30, 1985

[30] Foreign Application Priority Data

Oct. 31, 1984 [JP] Japan .................. 59-229656

[51] Int. Cl.$^4$ .................. B27N 5/02; B32B 27/36; B32B 27/28; B32B 27/08
[52] U.S. Cl. .................. 428/35; 428/412; 428/475.2; 428/483; 428/516; 428/518; 428/520; 215/1 C; 264/126; 264/153; 425/523
[58] Field of Search .................. 264/126, 153; 425/523; 428/35, 36, 412, 475.2, 483, 516, 518, 520; 215/1 C

[56] References Cited

U.S. PATENT DOCUMENTS

| 3,977,153 | 8/1976 | Schrenk | 53/40 |
| 4,047,873 | 9/1977 | Farrell | 425/523 |
| 4,323,531 | 4/1982 | Bradley et al. | 264/113 |
| 4,352,766 | 10/1982 | Bradley et al. | 264/45.5 |
| 4,436,778 | 3/1984 | Dugal | 428/36 |
| 4,513,037 | 4/1985 | Collins | 428/35 |
| 4,535,901 | 8/1985 | Okudaira et al. | 215/1 C |
| 4,550,043 | 10/1985 | Beck | 428/36 |

Primary Examiner—John E. Kittle
Assistant Examiner—Patrick J. Ryan
Attorney, Agent, or Firm—Wenderoth, Lind & Ponack

[57] ABSTRACT

A multilayered container comprising a wall portion consisting of thermoplastic gas barrier resin (resin B) layers and thermoplastic resin (resin A) layers, with the terminal portion of the mouth opening being of a thermoplastic resin (resin A), said wall portion being a multilayered structure formed by alternately laminating the resin A layers and the resin B layers in such a manner that there are at least two resin B layers, with the proviso that there is one more of the resin A layer than the number of the resin B layers, said structure having been biaxially oriented.

1 Claim, 5 Drawing Figures

MULTILAYERED CONTAINER

This invention relates to a multilayered container which not only excels in gas barrier properties, transparency and mechanical strength but also does not undergo delamination even when used over a prolonged period of time.

In recent years, hollow containers using thermoplastic resins have found widespread use as containers of cosmetics, food, beverage, etc. because of such advantages as light weight, safety to bursting, etc.

In particular, hollow containers made of polyethylene terephthalate have been rapidly developed as a result of improvements in the biaxial stretching and blow molding techniques.

However, the biaxially oriented containers made of thermoplastic polyester resins composed mainly of polyethylene terephthalate are not infallible in their performance. Above all, in case the contents with which the containers are filled is food requiring high gas barrier properties, there are such drawbacks as that the taste of the contents is impaired for lack of gas barrier properties with respect to oxygen and carbon dioxide.

In order to remedy these drawbacks, it is already known that attempts have been made to provide a three-layer structure wherein the two outer layers are made of a thermoplastic polyester resin and the middle layer is made of a m-xylylene group-containing polyamide resin (hereinafter called "MX nylon"), which is a thermoplastic resin having gas barrier properties (Japanese Laid-open Patent Application Nos. 128516/82 and 128520/82). This container has the drawback that with the passage of time the gas that has passed through the thermoplastic polyester layer and intercepted by the MX nylon layer accumulates between the thermoplastic polyester layer and the MX nylon layer to cause delamination to take place.

In view of these drawbacks of the conventional products, the present inventors engaged in extensive research with the view of improving on these drawbacks. By separating the layer consisting of the gas barrier resin into two or more layers and thus partitioning the gas that accumulates between the layers, the present inventors succeeded in preventing the occurrence of delamination. And as a result of further research, the present invention was perfected.

An object of this invention is therefore to provide a multilayered container that is free of delamination. Another object is to provide a multilayered container having superior gas barrier and mechanical properties and free of delamination. A further object is to provide a multilayered container in which delamination does not occur even though it is used for a prolonged period of time as a container for beverages which require barrier properties against oxygen and/or carbon dioxide.

The present invention is thus directed to a multilayered container comprising a wall portion consisting of thermoplastic gas barrier resin (resin B) layers and thermoplastic resin (resin A) layers, with the terminal portion of the mouth opening being of a thermoplastic resin (resin A), said wall portion being a multilayered structure formed by alternately laminating the resin A layers and the resin B layers in such a manner that there are at least two resin B layers, with the proviso that there is one more of the resin A layers than the number of the resin B layers, said structure having been biaxially oriented.

Figure 2:
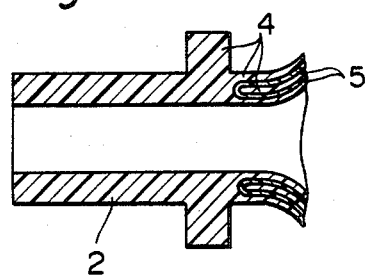

The present invention will now be more fully described with reference being had to the accompanying drawings, in which:

FIG. 1 is a plan view of a multilayered container of the present invention;

FIG. 2 being a sectional view of the terminal portion of the mouth opening; and

Figure 3:
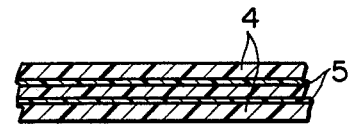

FIG. 3 being a sectional view of the wall portion of the multilayered container. In the drawings, the numeral 1 indicates the multilayered container, 2, the terminal portion of the mouth opening, 3, the wall portion 4, the resin A, and 5, the resin B.

Figure 4:
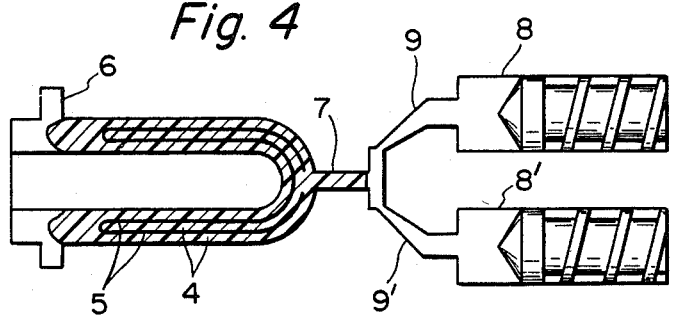

FIG. 4 is a view illustrating the principle on which the apparatus for injection molding the parison for producing the multilayered container of this invention is based. In the drawing, the numeral 6 indicates the mold, 7, the gate, 8 and 8' the cylinders for injecting the resins A and B, respectively (while the resins in the mold have been shown by means of hatches or solid lines, the resins in the cylinders have not been thus shown), and 9 and 9', the respective nozzles.

Figure 5:
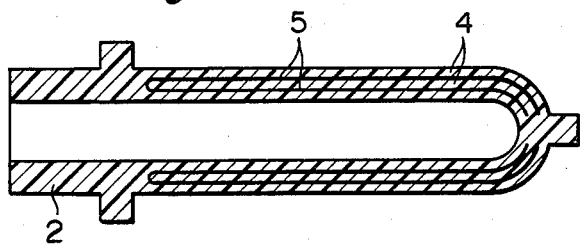

FIG. 5 is a sectional view of a parison that is used for producing the multilayered container of this invention.

Examples of the resin A used in this invention include the thermoplastic polyester resins, polyolefin resins, polycarbonates, polyvinyl chloride, polystyrene and their modified resin. The thermoplastic polyester resins are most preferred.

Examples of the resin B used in this invention, i.e. the thermoplastic resin with the gas barrier properties include MX nylons, ethylene-vinyl acetate copolymer resin saponification products, polyacrylonitrile copolymer resins, polyvinylidene chloride resins and their modified resin. The MX nylons are most preferred.

A combination of the thermoplastic polyester resins, above all, polyethylene terephthalate and MX nylons is especially to be preferred because it is excellent in all respects, i.e., transparency, mechanical strength, moldability for injection or blow molding and stretch blow molding properties.

Such thermoplastic polyester resins are usually polyesters wherein more than 80 mol%, preferably more than 90 mol%, of the acid component is terephthalic acid and more than 80 mol%, preferably more than 90 mol%, of the glycol component is ethylene glycol. Examples of the other remaining acid components are isophthalic acid, diphenylether-4,4'-dicarboxylic acid, naphthalene-1,4 or 2,6-dicarboxylic acid, adipic acid, sebasic acid, decane-1,10-dicarboxylic acid and hexahydroterephthalic acid. Examples of the other glycol components are propylene glycol, 1,4-butane diol, neopentyl glycol, diethylene glycol, cyclohexane dimethanol, 2,2-bis(4-hydroxyphenyl)propane and 2,2-bis(4-hydroxyethoxyphenyl)propane. Further available are polyester resins containing p-hydroxybenzoic acid, etc. as an oxyacid.

The intrinisic viscosity of these thermoplastic polyester resins is appropriately 0.55 or more, preferably 0.65–1.4. When the intrinsic viscosity is less than 0.55, difficulty is experienced in obtaining a multi-layered parison in a transparent and amorphous state. In addition, the mechanical strength of the container obtained is inadequate.

MX nylons are polymers containing at least 70 mol% of structural units obtained from m-xylylenediamine alone or a xylylenediamine mixture containing m- xylylenediamine and p-xylylenediamine in an amount of less than 30% of the total amount and an $\alpha.\omega$-aliphatic dicarboxylic acid having 6–10 carbon atoms.

Examples of these polymers include the homopolymers such as poly-m-xylylene adipamide, poly-m-xylylene sebacamide and poly-m-xylylene speramide, copolymes such as a m-xylylene/p-xylylene adipamide copolymer, m-xylylene/p-xylylene pyperamide copolymer and m-xylylene/p-xylylene azelamide copolymer, and copolymers of these homopolymer or copolymer components and aliphatic diamines such as hexamethylenediamine, cyclic diamines such as piperazine, aromatic diamines such as p-bis(2-aminoethyl)benzene, aromatic dicarboxylic acids such as terephthalic acid, lactams such as ε-caprolactam, ω-aminocarboxylic acids such as ω-aminoheptoic acid and aromatic aminocarboxylic acids such as p-aminobenzoic acid.

In these MX nylons there may be incorporated polymers such as nylon 6, nylon 66, nylon 610 and nylon 11.

The relative viscosity of these MX nylons is suitably at least 1.5, preferably 2.0–4.0.

In this invention, one or both of the resins A and B may, as required, be incorporated with such additives as coloring agents, ultraviolet absorbents, antistatic agents, antioxidants, lubricants and nucleating agents to an extent that they do not have an adverse effect on the achievement of the objectives of this invention.

The multilayered container of this invention is obtained by biaxially stretching and blow molding a parison having a multilayered structure formed by alternatingly laminating layers of resins A and B with the number of layers of resin B being at least two, while the number of layers of resin A being one more than the number of layers of resin B, and the terminal portion of the mouth opening of the parison being of the resin A.

As methods of producing such a parison, included are such methods as that of forming a bottom at one end of a multilayered tube obtained by extrusion molding a tube multilayeredly, that of successively molding and laminating the several layers by injection molding, and that of using a molding machine having injection cylinders corresponding to each of the resins used and continuously and successively injecting the molten resins into a single mold by means of one mold opening action. The third method is advantageously employed in industrial applications.

The third method will now be described taking by way of example the case a five-layered parison consisting of one class of resin A and one class of resin B.

FIG. 4 is a view showing the principle on which the operation of the apparatus used in this method is based. In the drawing, the numeral 6 indicates the mold, 7, the gate, 8 and 8', the cylinders for injecting the resin A and resin B, respectively (while the resins in the mold have been shown by means of hatches or solid lines, the resins in the cylinders have not been thus shown), and 9 and 9', the nozzles. A switching valve may be provided at the gate portion or switching valves may be provided at the nozzle portions.

The injection molding method, if specifically described, is carried out in the following manner. First, resin A is injected from the injection cylinder 8. After stopping the injection of resin A, resin B is injected from the injection cylinder 8'. After stopping the injection of resin B, resin A is again injected from the injection cylinder 8, but this time the injection is carried out until the inside of the mold is fully filled with the resin A, and at the same time the pressure is maintained. After the mold has completely cooled, it is opened and the shaped product is removed.

Conditions preferred for carrying out the injection are, for example, as follows:

(1) $V1 \geq V2$
(2) $8 \text{ cc/sec} \leq V2 \leq 35 \text{ cc/sec}$
(3) $0.7 \leq A1/A2 \leq 1.6$
(4) $B1/(A1+A2+B1) \leq 0.25$ wherein:
V1: Injection speed of the initially injected resin A
V2: Injection speed of the finally injected resin A
A1: Injection volume of the initially injected resin A
A2: Injection volume of the finally injected resin A
B1: Injection volume of resin B A multilayered parison such as shown in section in FIG. 5 is thus obtained by following the procedure described hereinabove. After heating the thus obtained parison at its stretching temperature, it is biaxially stretched and blow molded by expanding it inside a blow mold by means of a stretching rod moving in the axial direction and by blowing in a pressurized gas, whereby there is obtained a multilayered container.

When the resin A is a thermoplastic polyester resin, and the resin B is MX nylon, the stretching temperature may be about the same as that of a parison made of a thermoplastic polyester resin alone, it being suitably in the range of 70° to 130° C. In general, a suitable stretching temperature is one ranging from a temperature 15° C. higher than the glass transition temperature of the resin A to a temperature 15° C. higher than two times the glass transition temperature.

The stretching is preferably carried out to a stretch reatio of 1 to 4× in the axial direction, and a ratio of 2 to 7× in the peripheral direction. Still more to be preferred is for the areal stretch ratio to be from 5 to 15×.

The amount of the resin B to be used in the container as a whole may be chosen from an amount ranging from 1 to 50 volume %, but since the gas barrier resins usually are poor in their mechanical properties and transparency, they are preferably used in the least amount required for achieving the required gas barrier performance. An amount not exceeding 25 volume %, and especially an amount ranging from 1 to 20 volume %, is preferred.

For preventing delamination taking place between the layers, it is preferred in this invention that the number of layers of the resin B be provided in a greater number, but in consideration of productivity, 2 to 4 layers are suitably used.

Generally, the wall thickness of a multilayered parison is from 2 to 6 mm, preferably 3 to 5 mm. On the other hand, the thickness of the wall portion of a biaxially stretched and blow molded multilayered container is from 200 to 500 microns, preferably 250 to 450 microns.

The ratios of the thicknesses of the outer layer consisting of the resin A, the intermediate layer consisting of the resin A, and the intermediate layer consisting of the resin B should preferably be in a range of 50–70:30–50:3–20.

Since in the multilayered container of this invention at least two layers of the gas barrier resin layers are used, the gas that has passed through the other resin layers do not accumulate in one place. Hence, delamination can be prevented.

In the multilayered container of this invention the terminal portion of the opening is formed of resin A alone, and thus since the resin B is not exposed at the opening end, there is no possibility of the loss of transparency and changes of properties of the resin B layer due to the effect of the contents.

The multilayered container of this invention thus not only excels in such properties as gas barrier properties, transparency and mechanical properties but also demonstrates its superiority in that delamination does not take place even though it is used over a prolonged period of time.

The following examples will serve to more fully illustrate the present invention.

The following methods of measuring the properties were employed.

(1) Intrinsic viscosity [$\eta$] of polyester resin

The measurement was made at 30° C. using a solvent mixture of phenol/tetrachloroethane (6/4 weight ratio).

(2) Relative viscosity [$\eta$ rel.] of polyamide resin

Measured at 25° C. on a solution of 1 g of resin in 100 ml of 96% sulfuric acid.

(3) Haze

A specimen was cut out from the wall of the container and measured using a hazeometer Model NDH-20 manufactured by Nippon Denshoku Kogyo Co. Ltd.

(4) Oxygen permeability

Measured at 20° C. and a relative humidity of 65% using OXTRAN 100 manufactured by Modern Control Company.

(5) Storability test

The container to be tested is filled with 7% dilute sulfuric acid to the fill point followed by the addition of sodium bicarbonate in an amount such that the amount evolved of carbon dioxide becomes 4 gas volumes (3.7 kg/cm$^2$ at 20° C.). The container is then sealed and allowed to stand at room temperature, following which the state of the container is observed.

EXAMPLE 1 and COMPARATIVE EXAMPLE 1

Polyethylene terephthalate having an intrinsic viscosity of 0.75 (PET) was used as the thermoplastic polyester resin, and poly-m-xylylene adipamide having a relative viscosity of 2.1 (N-MXD6) was used as the MX nylon, and while staggering the timing of their injection they were injected in the sequence of PET→N-NXD6→PET using a 2-cylinder injection molding machine to form a 5-layered parison having an outside diameter of 30 mm, a length of 120 mm and a wall thickness of 4 mm in which 3 layers of the PET layer and 2 layers of the N-MXD6 layer were laminated alternately.

By way of comparison, a 3-layered parison having the same dimensions was formed using the same 2-cylinder injection molding machine and by injecting the resins while staggering their timing in the sequence of PET→N-MXD6 to alternately laminate 2 layers of the PET layer and 1 layer of the N-MXD6 layer.

The injection conditions employed in common in these two experiments were as follows:

| Cylinder temperature | |
|---|---|
| PET side | 275° C. |
| N-MXD6 side | 265° C. |
| Mold temperature | 20° C. |
| Time injection pressure maintained | 10 sec. |
| Cooling time | 15 sec. |
| Injection speed of N-MXD6 | 51.4 cc/sec. |

Next, by using a biaxially stretching and blow molding machine the two classes of parisons obtained as described above were heated with a quartz heater until the surface temperature of the parisons reached 95° C., after which they were conveyed to the inside of a mold where they were biaxially stretched and blow molded under the conditions of a stretching rod conveying speed of 20 cm/sec. and a stretching and blowing-in pressure of 20 kg/cm$^2$, whereby there was obtained a bottle-shaped hollow multilayered container having a total length of 275 mm, an outside diameter of 80 mm and inside capacity of 1000 ml.

The thicknesses of the wall portion of the multilayered containers obtained were as follows: In the case of the 5-layered container (Example 1), the two PET layers forming the outside layer were 90 microns in both instances, the single PET layer forming the middle layer was 140 microns, and the two N-MXD6 layers forming the intermediate layers were 15 microns in both instances. The total thickness of the 5-layered structure was 350 microns. On the other hand, in the case of the 3-layered container (Comparative Example 1), of the two PET layers forming the outside layers, the layer at the inside of the container was 90 microns, while the layer at the outside of the container was 230 microns. The one N-MXD6 layer forming the middle layer was 30 microns, and the total thickness of the 3-layered structure was 350 microns.

When the haze and oxygen permeability of the two classes of multilayered containers obtained were measured, it was found that in the case of the multi-layered container of Example 1 the haze was 1.6%, while the oxygen permeability was 0.08 cc/day. On the other hand, in the case of the multilayered container of Comparative Example 1 the haze was 1.5%, and the oxygen permeability was 0.08 cc/day.

When a storability test was conducted on the two classes of multilayered containers obtained, the following results were obtained. In the case of the multilayered container of Example 1, even after the passage of one year there was noted no delamination of the layers nor change in the shape of the container. On the other hand, in the case of the multilayered container of Comparative Example 1 there was an accumulation of gas between the PET layer at the inside of the container and the N-MXD6 layer, and the layers become completely separated. Further, since the N-MXD6 layer and the PET layer at the outside of the container had been subjected to internal pressure, the container swelled and became deformed.

What is claimed is:

1. A multilayered container wherein the terminal portion of the mouth opening is a single-layered structure of polyethylene terephthalate (resin A), and the wall portion is a five-layered structure composed of two layers of a m-xylylene group-containing polyamide resin (resin B) and three layers of resin A in which the middle layer and the innermost and outermost layers are formed of resin A and the two intermediate layers between the middle layer and the innermost and outermost layers are formed of resin B, said container being formed by biaxially stretching a parison obtained by sequentially injection-molding two resins A and B, the thickness of the wall portion ranging from 200 to 500 microns, and the ratios of the thicknesses of the innermost and outermost layers, middle layer and intermediate layers being in the ranges of 50–70:30–50:3–20.

* * * * *